(12) United States Patent
Wiggins et al.

(10) Patent No.: US 9,573,664 B2
(45) Date of Patent: Feb. 21, 2017

(54) VARIABLE DRAG AREA TOW SYSTEM AND METHODS

(71) Applicant: Adaptive Methods, Inc., Rockville, MD (US)

(72) Inventors: Jim Wiggins, Thurmont, MD (US); Conrad Zeglin, Rockville, MD (US); Walter Allensworth, Poolesville, MD (US)

(73) Assignee: Adaptive Methods, Inc., Rockville, MD (US)

( * ) Notice: Subject to any disclaimer, the term of this patent is extended or adjusted under 35 U.S.C. 154(b) by 363 days.

(21) Appl. No.: 13/953,124

(22) Filed: Jul. 29, 2013

(65) Prior Publication Data

US 2015/0028156 A1    Jan. 29, 2015

(51) Int. Cl.
*B63B 21/66* (2006.01)
*B64D 3/02* (2006.01)

(52) U.S. Cl.
CPC ............. *B63B 21/66* (2013.01); *B63B 21/663* (2013.01); *B64D 3/02* (2013.01)

(58) Field of Classification Search
CPC ......... B64D 39/04; B63B 21/66; B63B 21/56; B63B 21/663; B63B 2021/666
USPC ................. 114/242, 243, 244, 245, 246, 253
See application file for complete search history.

(56) References Cited

U.S. PATENT DOCUMENTS

| | | | | | |
|---|---|---|---|---|---|
| 5,427,333 | A | * | 6/1995 | Kirkland | B64D 39/00 244/135 A |
| 5,839,695 | A | * | 11/1998 | Puskas | B64D 17/02 244/142 |
| 6,994,294 | B2 | * | 2/2006 | Saggio, III | B64D 39/04 141/382 |
| 2009/0302162 | A1 | * | 12/2009 | Reed | B64D 39/04 244/135 A |

OTHER PUBLICATIONS

D. Putnam, "Fat Line Towed Array Straightening System," Navy SBIR 2012.01—Topic N121-074. http://www.navysttr.net/n12_1/N121-074.htm.

* cited by examiner

*Primary Examiner* — Andrew Polay
(74) *Attorney, Agent, or Firm* — Blank Rome LLP

(57) ABSTRACT

A variable drag area tow system including a tow cable, and a variable drag area device having a variable projected area, the variable drag area device is configured to have a smaller projected area as the velocity of the variable drag area device with respect to a fluid increases. A method of maintaining tension on a tow cable, the method including deploying at a first velocity a variable drag area device having a variable projected area, increasing the first velocity to a second velocity, and decreasing the projected area of the variable drag area device as the first velocity is increased to the second velocity.

22 Claims, 9 Drawing Sheets

VARIABLE DRAG AREA TOW SYSTEM AND METHODS

This invention was made with government support under contract #N00024-12-P-4096 awarded by Naval Sea Systems Command. The government has certain rights in the invention.

FIELD OF THE INVENTION

This invention relates generally to towed apparatuses and methods, and in particular to water and air-based towed applications.

BACKGROUND

Towed systems are used in a variety of applications, for example, advertising, exploration, scientific study, and military defense. In a typical application, an air or seagoing vessel will tow a desired system behind the vessel via a tow cable, for example, an advertisement or a sonar array. When the vessel is going a sufficient speed, the drag induced by the system and the tow cable cause sufficient tension on the tow cable to minimize the droop (the vertical height between the attachment point of the tow cable to the vessel and the back of the tow cable or towed system). However, as the speed of the vessel decreases, the induced drag on the towed cable also decreases causing the droop to increase, thus limiting the operational conditions of the vessel while towing.

Accordingly, there is a need and desire for systems and methods to increase the operational conditions of vessels performing towing operations.

DETAILED DESCRIPTION OF THE INVENTION

Figure 1A:
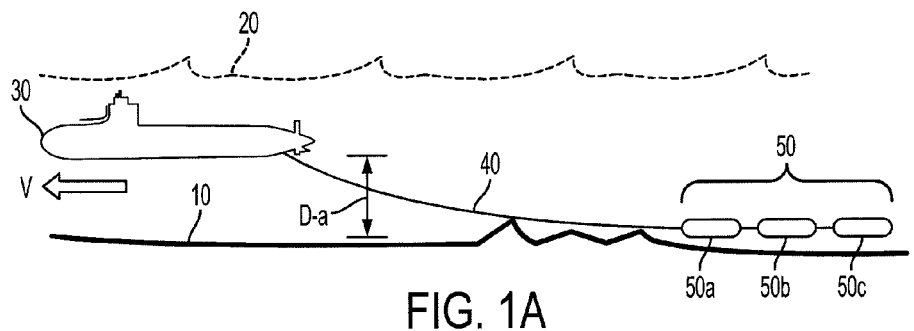
FIGS. 1A-1C show overview schematics in accordance with disclosed embodiments.

In the following detailed description, reference is made to the accompanying drawings, which form a part hereof and illustrate specific embodiments that may be practiced. In the drawings, like reference numerals describe substantially similar components throughout the several views. These embodiments are described in sufficient detail to enable those skilled in the art to practice them, and it is to be understood that structural and logical changes may be made. The sequences of steps are not limited to those set forth herein and may be changed or reordered, with the exception of steps necessarily occurring in a certain order.

The problem of increasing the operational conditions of a vessel towing a tow cable is solved by providing a tow cable with a variable drag area device. As set forth herein, the variable drag area tow systems and methods allow for increased operational conditions of a vessel while towing. For example, as a vessel towing a towed system decreases its speed, the droop between the back of the towed system and the vessel increases. This may require an aircraft to increase its altitude or a submarine to decrease its depth (increase its distance to the ocean floor) to allow a safe distance between the towed system and ground or ocean floor, respectively. However, the aircraft or submarine may be restricted physically or due to operational regulations or constraints from operating at different altitudes or depths. Similarly, a surface ship may be restricted from entering shallow water if it decreases its speed or cannot decrease its speed once in shallow water. By varying the drag on the tow cable during operation, a vessel has increased dynamic operating conditions for safe towing while minimizing the risk of damage to the towed system and its surroundings.

Disclosed embodiments include a variable drag area tow system including a tow cable and a variable drag area device having a variable projected area, which is configured to have a smaller projected area as the velocity of the variable drag area device with respect to a fluid increase. In another embodiment, the variable drag area device is configured to have a larger projected area as the velocity of the variable drag area device with respect to the fluid decreases. Moveable drag fins can be configured to vary the projected area of the variable drag area device when the at least one moveable drag fin is moved. Disclosed embodiments also include methods of maintaining tension on a tow cable including, deploying at a first velocity a variable drag area device having a variable projected area, increasing the first velocity to a second velocity, and decreasing the projected area of the variable drag area device as the first velocity is increased to the second velocity. The methods may also include decreasing the second velocity to a third velocity and decreasing the projected area of the variable drag area device as the second velocity is decreased to the third velocity.

The following example embodiments are disclosed in the context of a submarine towed system. However, it will be appreciated that those skilled in the art will be able to incorporate the invention into numerous other alternative systems that, while not shown or described herein, embody the principles of the invention. Such alternative systems may include, for example, surface vessels and aircraft. It should also be noted that velocity, throughout this application, refers to the velocity of the vessel, towed system, variable drag area device, or tow cable relative to the fluid around it (i.e. air or water).

FIG. 1A shows a submarine 30 operating between the ocean surface 20 and the ocean floor 10. Submarine 30 is towing a tow body 50. Tow body 50 is shown having several sub-components 50a-c. Submarine 30 tows tow body 50 via a tow cable 40 attached to both the submarine 30 and the tow body 50. The drag on the tow body 50 is approximately proportional to the square of its velocity. Therefore, if Submarine 30 decreases its speed to a relatively slow speed V, the drag on tow body 50 and tow cable 40 is relatively small as compared to a higher velocity. Thus decreasing the tension of tow cable 40 and causing the droop D-a to be relatively large. If the submarine 30 is under operational restrictions not to surface, the towed system is in danger of striking the ocean floor 10 at low velocity V.

Figure 1B:
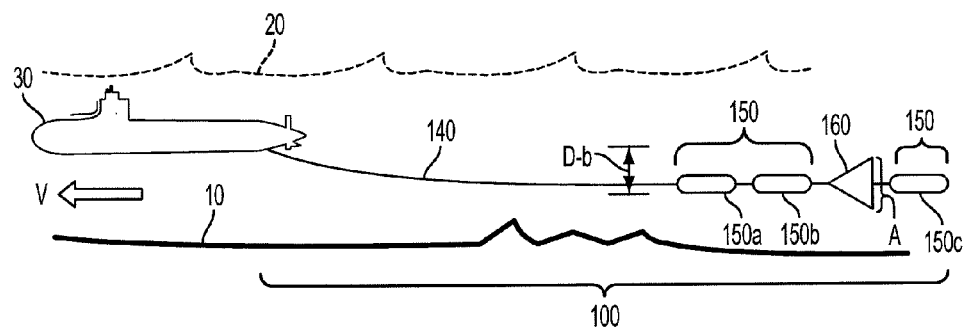

FIG. 1B shows submarine 30 operating in the same location at the same speed V as in FIG. 1A, but the submarine in FIG. 1B is towing variable drag area tow system 100 which allows submarine 30 to operate with less risk of striking the ocean floor 10. Variable drag area tow system 100 includes tow cable 140, tow body 150 and variable drag area device 160. Tow body 150 may be, for example, a towed sonar array or any other towed system depending on the vessel application, for example, a fishing trawl or barge may be towed by a surface ship, or an advertisement banner may be towed by an aircraft. Although tow body 150 is shown having three sub-components 150a-c, any number of sub-components can be used including a single sub-component or a plurality of sub-components.

Tow body 150 is connected to submarine 30 via tow cable 140. Tow cable 140 should be designed of sufficiently strong materials to pull tow body 150 and variable drag area device 160 throughout its particularly designed operating conditions. In one embodiment, tow cable 140 transmits electrical power to towed system 150. Tow cable 140 can also be configured to transmit signal information between submarine 30 and towed system 150 such as sonar transmissions or any other electrical signal.

To prevent the droop D from exceeding a maximum design value, variable drag area device 160 is included to create drag in addition to the drag normally created inherently by the tow cable 140 and the tow body 150. The additional drag created by variable drag area device 160 varies with the drag area of variable drag area device 160 as well as its velocity. The projected area, defined as the projection of variable drag area device 160 in reference to a plane perpendicular to the direction of movement, i.e. in the direction of V, is a reasonable approximation for the actual drag area of variable drag area device 160 and will be used herein. By including variable drag area device 160, having a projected area A, additional drag force is placed on tow cable 140, tensioning tow cable 140 and decreasing droop D-b as compared to the same variable drag area tow system 100 but without variable drag area device 160 and also as compared to droop D-a (FIG. 1A). This allows submarine 30 to operate at relatively slow speed V in shallow water.

Variable drag area device 160 is configured to vary its projected area A based on its relative velocity through the fluid around it, in this case water. Therefore, at relatively low velocity V, the projected area A of variable drag area device 160 will be larger than the same variable drag area device 160 (shown as projected area A') at a higher velocity V' (FIG. 1C), discussed in more detail below. In one example, variable drag area device 160 is approximately neutrally buoyant so as not to significantly alter the buoyancy characteristics of tow body 150.

Variable drag area device 160 can be attached to tow cable 140 forward of tow body 150 (between submarine 30 and tow body sub-component 150a) (not shown), between tow body 150 sub-components (as shown between sub-components 150b and 150c), or aft of tow body 150 (not shown). For example, where tow body 150 and/or tow cable 140 is long, variable drag area device 160 can be attached aft of tow body 150. In another example, where tow body and/or tow cable 140 is shorter, variable drag area device 160 can be attached between or forward of tow body 150 sub-components. In another example, variable drag area device 160 can be attached directly to tow body 150 or to one of tow body sub-components 150a-c. When connected forward of or in between tow body sub-components, variable drag area device 160 can be configured to pass power and electrical signals to sub-components aft of variable drag area device 160 through electrical connections. In any case, variable drag area device 160 is detachably connected such that variable drag area device 160 can be attached and detached to tow body 150 or tow cable 140. This enables the variable drag area device 160 to be easily moved to another submarine 30 (or other vessel) easily.

Figure 1C:
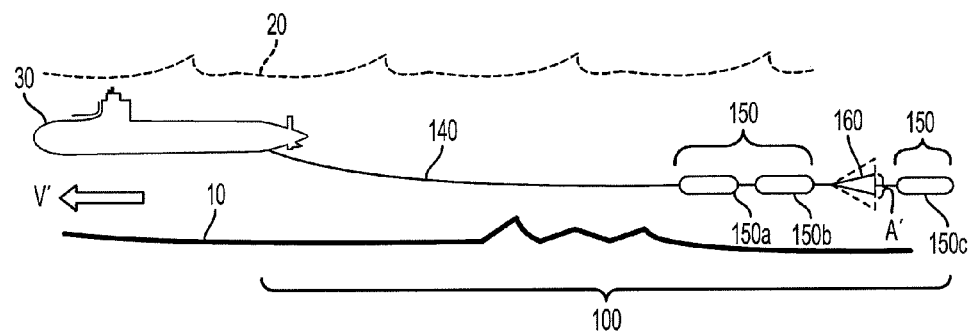

FIG. 1C shows submarine 30 operating at the same location and towing the same variable drag area tow system 100 as that shown in FIG. 1B. However, submarine 30 is traveling at speed V', which is greater than velocity V (FIG. 1B). As velocity increases, the drag created by tow cable 140 and tow body 150 increases approximately proportional to the square of the relative velocity increase. Therefore, variable drag area device 160 is configured to have a smaller projected area A' as velocity increases in order to decrease its contribution to the overall drag force of variable drag area tow system 100 (instead of the variable drag area device 160 remaining at a constant projected area). This reduction in projected area from A to A' in turn reduces unnecessary stress on tow cable 140 and the submarine 30 attachment points, reduces turbulent flow, and consequently reduces the need for a heavy and more costly tow cable 140 to obtain higher speeds.

Figure 2:
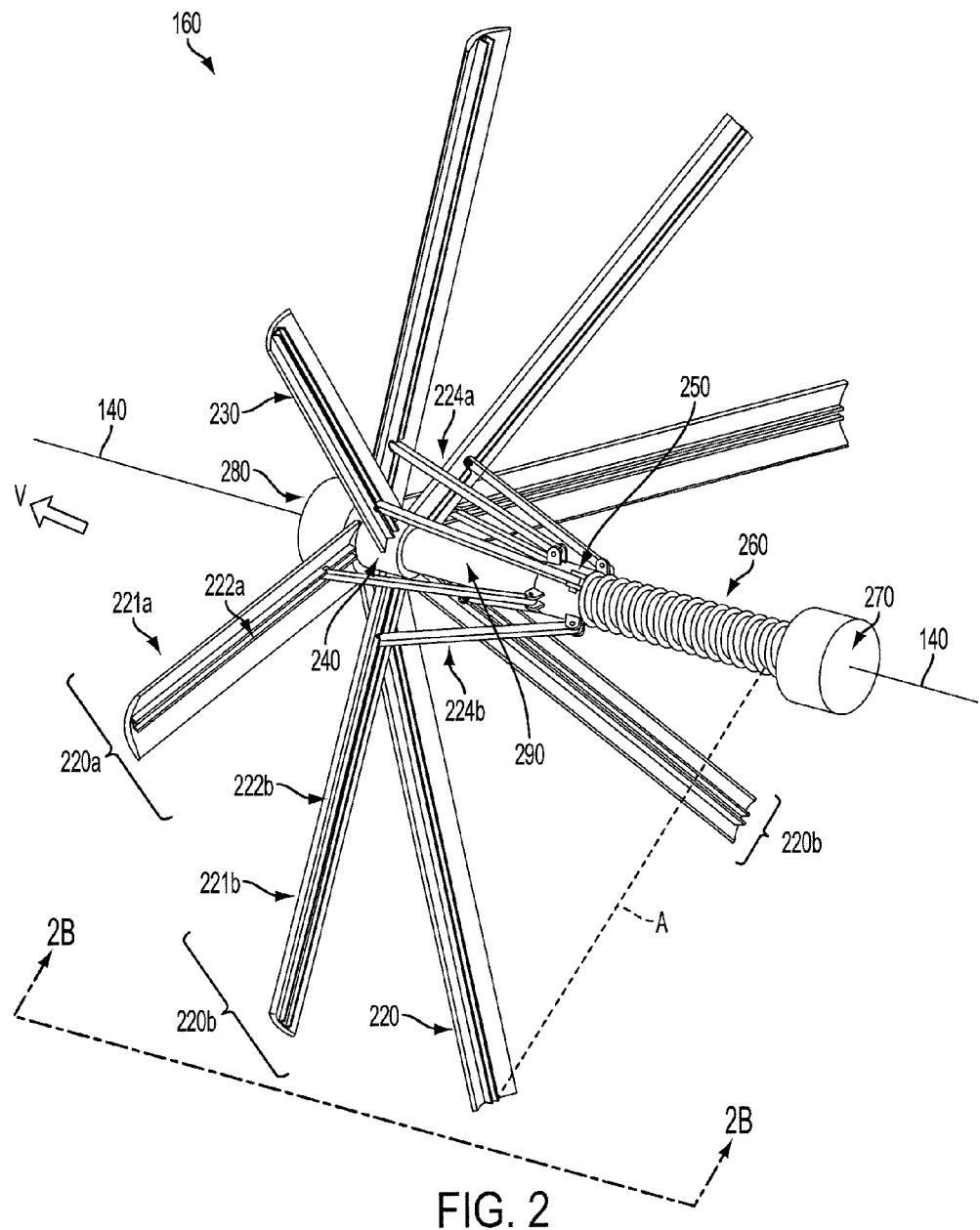
FIG. 2 is a drag device in accordance with disclosed embodiments.

FIG. 2 shows one embodiment of variable drag area device 160 in a fully open position and oriented such that the direction of movement is indicated by the arrow V. The example variable drag area device 160 uses drag fins 220 to vary the projected area. Front attachment 280 and back attachment 270 are shown connected directly to tow cable 140, however front attachment 280 and back attachment 270 can also be connected directly to tow body 150 (FIG. 1). Both front and back attachments 280, 270 can be made of any structurally sufficient material for the intended operating environment and structural stresses. In one example, front attachment 280 and back attachment 270 are made from titanium, stainless steel, and/or any alloys thereof. Support structure shaft 290 connects the front attachment 280 to back attachment 270 and gives overall structural support to variable drag area device 160. Similarly, support structure shaft 290 can be made of any material structurally sufficient for the intended operating environment and structural requirements; however overall buoyancy design should be considered when choosing materials. For example, support structure shaft 290 can be made from titanium, stainless steel, and/or any alloys thereof. Support structure shaft 290 can be hollow, filled with oil, foam, or any combination of materials to alter buoyancy. In another example, both front and back attachments 280, 270 can be integrated into support structure shaft 290.

In this example, variable drag area device 160 includes drag fins 220. Drag fins 220 can include outer drag fins 220a and inner drag fins 220b. Although four outer drag fins 220a and four inner drag fins 220b are shown, it should be understood that any number of drag fins 220 can be used, including for example, no inner drag fins 220b. Each drag fin 220 includes a drag surface 221 connected to a drag arm 222 which is connected to a mechanical linkage 224. Each drag surface 221 can be made of any material meeting the strength and buoyancy requirements of a particular use environment. For example, materials can include carbon fiber and/or polypropylene, as well as metal or other polymers. Each drag surface 221 can have a smooth surface, a rough surface, or any other textured surface to alter the contribution from surface friction or other surface effects to the drag.

The drag arms 222 are each connected to support structure shaft 290; however each drag arm may be first connected to a receiving ring 240 which can be integrated or connected to support structure shaft 290. Each mechanical linkage 224 is also connected to a moveable support ring 250. Support ring 250 is configured to be moveable along support structure shaft 290 and can move in the same or opposite direction of arrow V.

Variable drag area device 160 includes expansion mechanism 260 configured to oppose the movement of support ring 250 in the direction opposite of arrow V or to move support ring 250 in the direction of arrow V. As shown, expansion mechanism 260 is a spring on the outside of support structure shaft 290. The spring of expansion mechanism 260 can include a single spring or a plurality of springs and can have any suitable spring characteristic for the desired resistance profile. For example, progressive, linear, degressive, progressive with a knee, or any other spring characteristic. Other configurations for expansion mechanism 260 can include a compressible fluid such as a gaseous or hydraulic cylinder, a powered linear actuator or any other mechanism which can be configured to exert a force in the direction of arrow V or as it is compressed. In another example, expansion mechanism 260 can be configured internal to structural support 290.

FIG. 2 shows variable drag area device 160 in a fully expanded position at a low velocity in the direction of arrow V. The angle between drag fins 220 and the support structure shaft 290 is at its greatest, and thereby the distance A between drag fins 220 and support structure shaft 290 is at its greatest length. Therefore the projected area is also at its greatest.

Figure 2B:
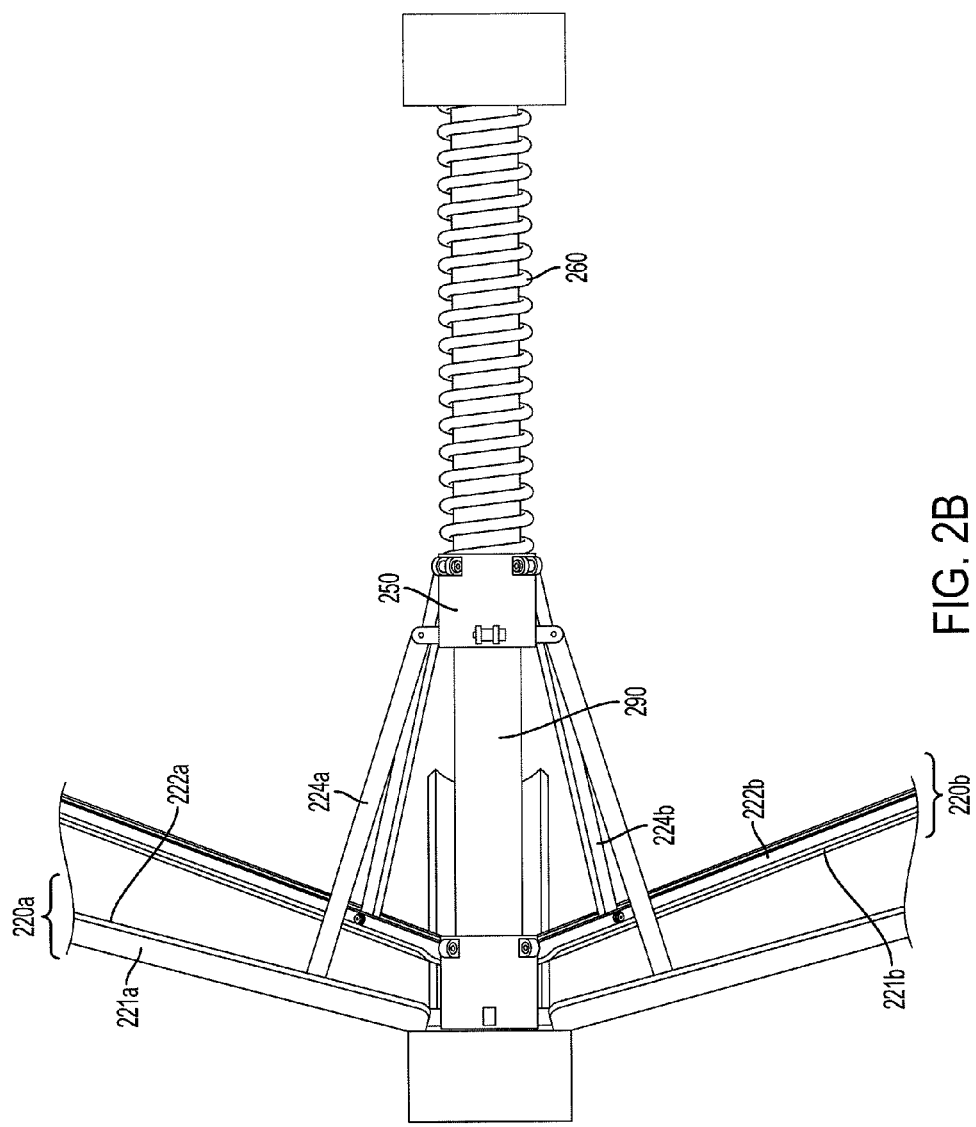
FIG. 2B is a perspective view of the drag device of FIG. 2 along lines 2B of FIG. 2.

FIG. 2B shows a side view of the variable drag area device 160 of FIG. 2 along line 2B-2B (FIG. 2).

Figure 3:
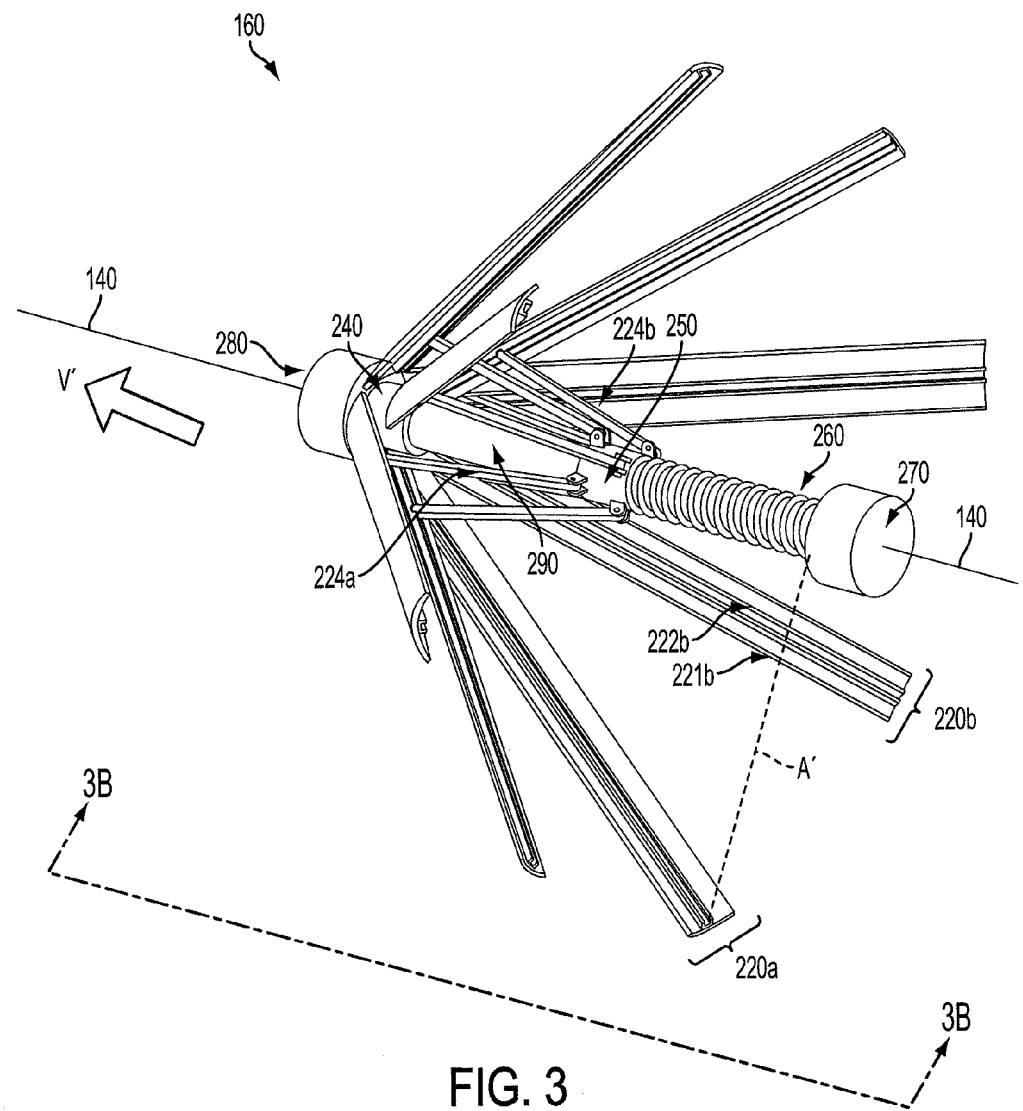
FIG. 3 is a drag device in accordance with disclosed embodiments.

FIG. 3 shows the same variable drag area device 160 as that shown in FIG. 2. However its velocity in the direction of arrow V' is higher in FIG. 3 than in FIG. 2. Because its velocity has been increased, the force acting on the drag fins 220 has increased causing the drag fins 220 to angle more towards the support structure shaft 290 and for support ring 250 to be positioned further along shaft 290 from front attachment 280. The movement of drag fins 220 towards the support structure is resisted by the mechanical linkage 224 and ultimately by expansion mechanism 260 which exerts a stronger spring force in the direction of arrow V' as it is compressed. The angle between drag fins 220 and the support structure has decreased causing the distance A' between fin drag fins 220 and support structure shaft 290 to also decrease as compared to distance A (FIG. 2), and therefore the projected area is also decreased as compared to the variable drag area device 160 at a lower velocity in FIG. 2. If the velocity in direction of arrow V' were to decrease, expansion mechanism 260 is configured to push moveable support ring in the direction of arrow V' (closer to front attachment 280) and the projected area of variable drag area device 160 would increase.

Figure 3B:
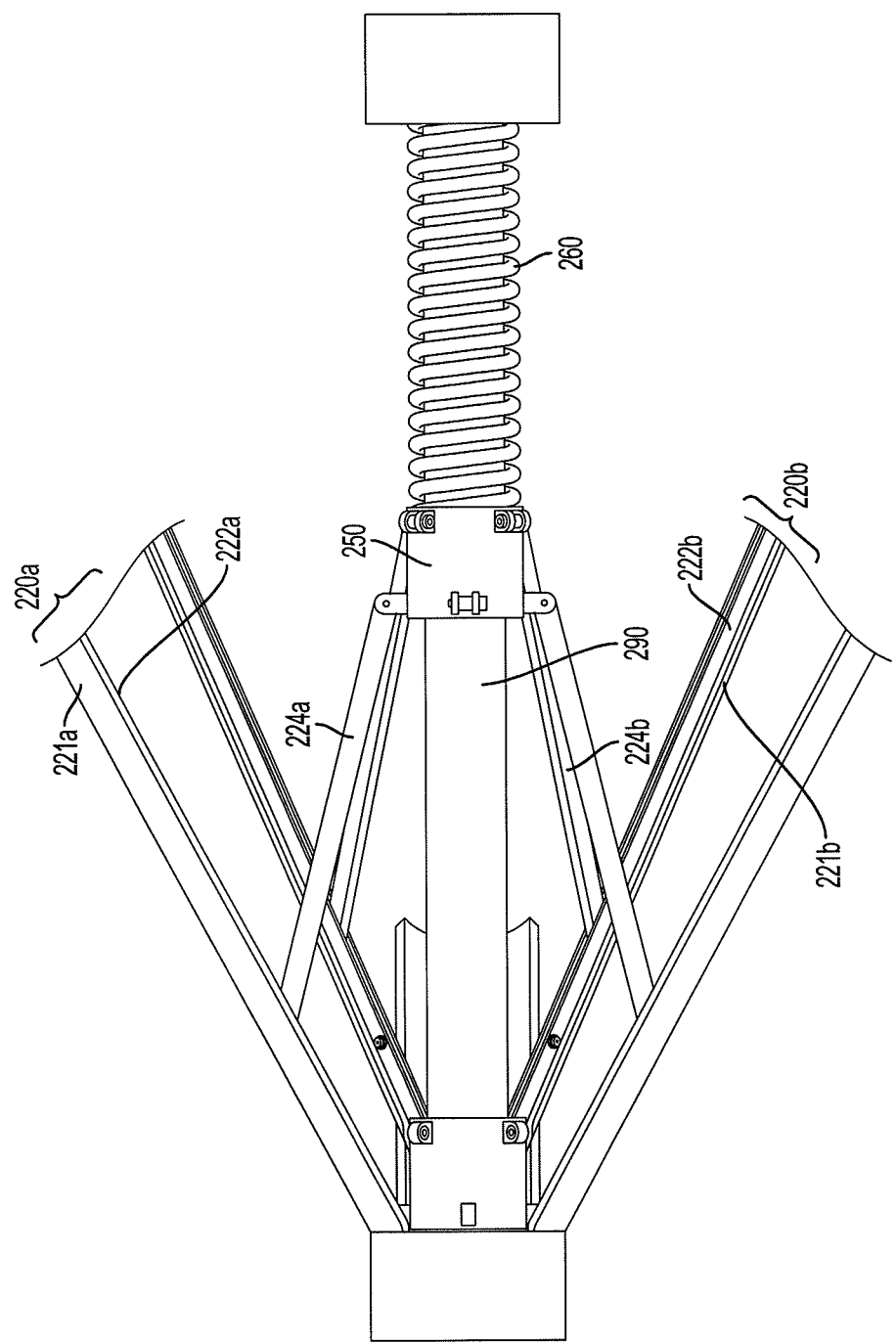
FIG. 3B is a perspective view of the drag device of FIG. 3 along lines 3B of FIG. 3.

FIG. 3B shows a side view of variable drag area device 160 of FIG. 3 along line 3B-3B (FIG. 3).

Figure 4:
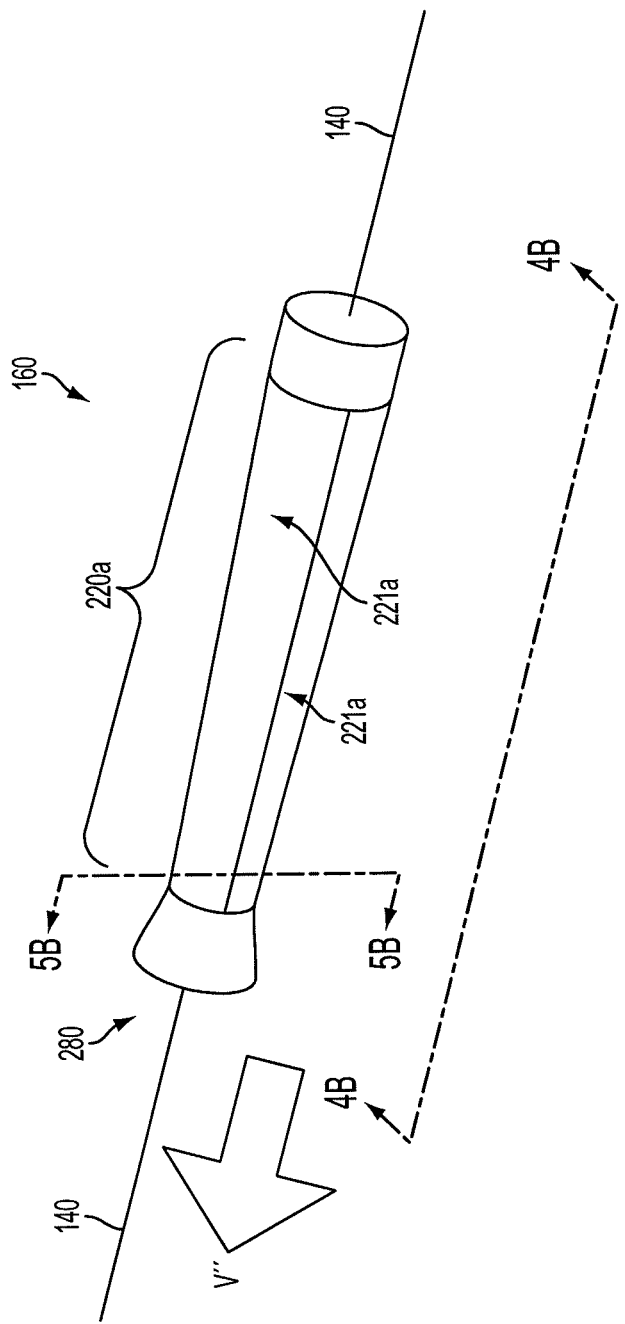
FIG. 4 is a drag device in accordance with disclosed embodiments.

FIG. 4 shows the same variable drag area device 160 as that shown in FIGS. 2 and 3. However its velocity in the direction of arrow V" is higher in FIG. 4 than in both FIGS. 2 and 3. Because its velocity has been increased, the force acting on the drag fins 220 has increased causing the drag fins 220 to collapse towards the support structure shaft 290 (not shown). The angle between drag fins 220 and the support structure has decreased even further causing the projected area to also decrease substantially as compared to the variable drag area device 160 at the lower velocity in FIGS. 2 and 3. In this embodiment, inner drag fins 220b (not shown) are positioned entirely inside of outer drag fins 220a. The drag surfaces 221 a of outer drag fins 220a form the outside surface shown in FIG. 4.

Figure 4B:
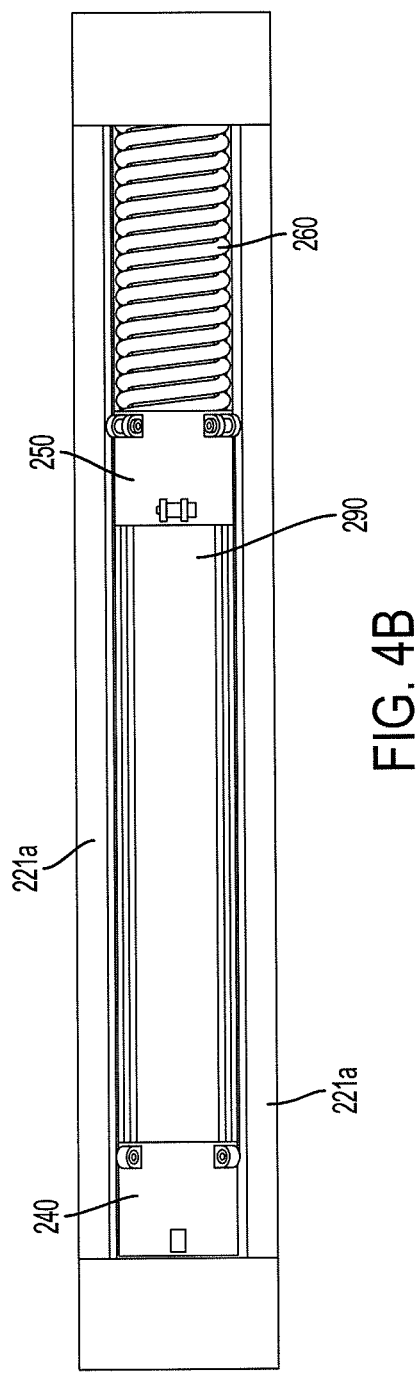
FIG. 4B is a cross-sectional view along lines 4B of FIG. 4 of the drag device of FIG. 4.

FIG. 4B shows a cross sectional view of variable drag area device 160 along line 4B-4B (FIG. 4).

Figure 5A:
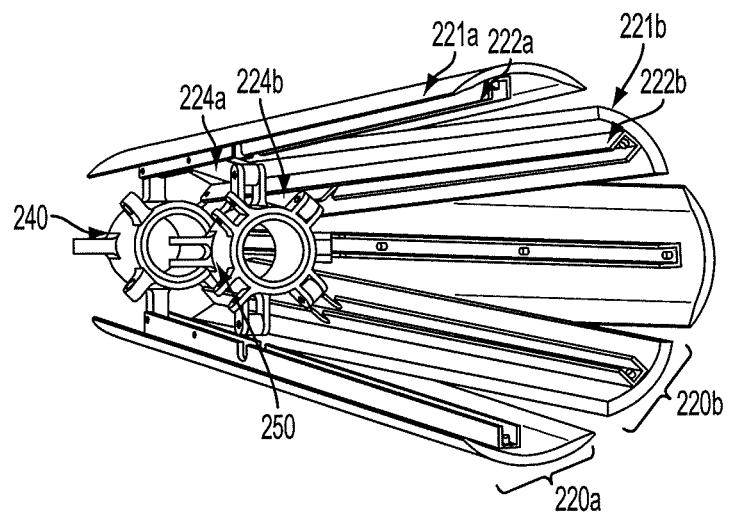
FIGS. 5A and 5B show a drag device in accordance with disclosed embodiments.
Figure 5B:
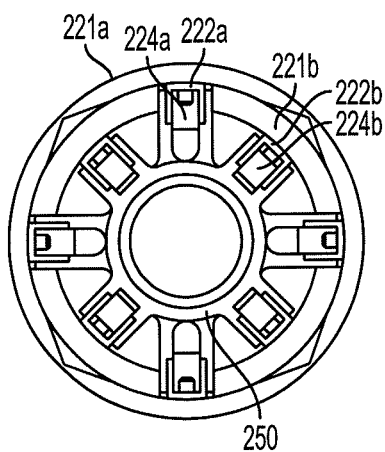

FIGS. 5A and 5B show different views of a portion of variable drag area device 160. Support structure shaft 290 and expansion mechanism 260 are not shown. FIG. 5A is a longitudinal perspective view which shows drag fins 220 partially collapsed. FIG. 5B is a cross-sectional view of variable drag area device 160 along line 5B-5B of FIG. 4 where drag fins 220 are fully collapsed and the inner drag fins 220b are positioned entirely inside of outer drag fins 220a. In this example, the mechanical linkage 224 is nested within the drag arms 222, while notches in the drag arms 222 match protrusions in the support ring 250 to allow the drag arms to lie substantially flat. This enables for a more compact structure when fully collapsed.

Figure 6:
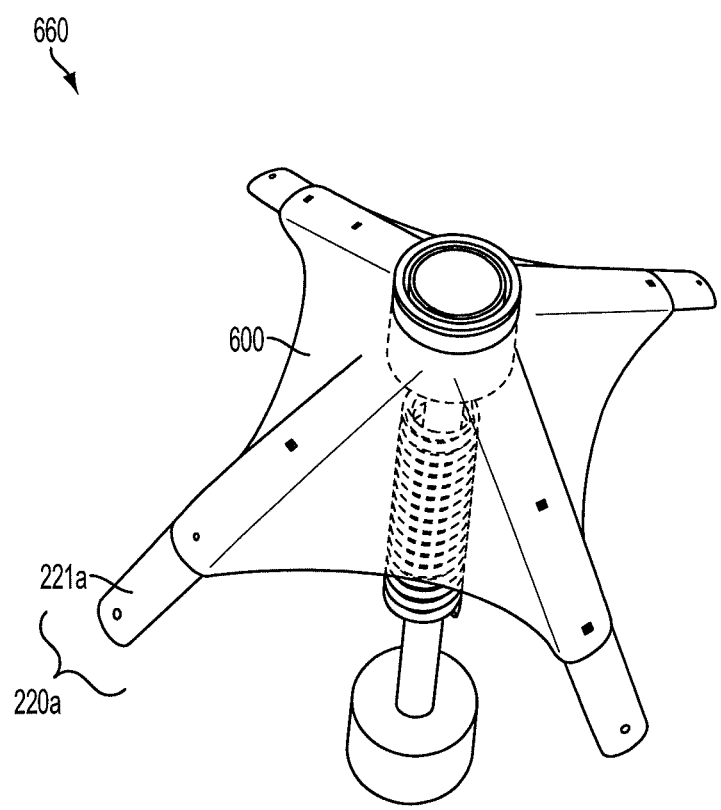
FIG. 6 is a drag device in accordance with disclosed embodiments.

FIG. 6 shows another embodiment of variable drag area device 660 which is formed of similar construction and materials as those described above with respect to variable drag area device 160. However variable drag area device 660 includes a membrane 600 attached to the drag fins 220 to further increase the projected area of variable area drag device 660 when at least partially opened. Portions of the variable drag device 660, including the receiving ring 240, support ring 250, and mechanical linkage 224 are not shown for clarity.

Design constraints may limit the maximum dimensions of the variable drag device 160 (FIGS. 1-5) or variable drag device 660. For example, the variable drag device 160 (FIGS. 1-5) or variable drag device area device 660 can be stored and deployed from the same location as tow body 150 (FIG. 1). In one example, tow body 150 and/or variable drag area device 160, 660 are deployed and retrieved from submarine 30 (FIG. 1) through a fixed size opening. The fixed size opening can be approximately circular in shape, or any other shape. Similarly, variable drag area device 160, 660 can be stored within a variable drag area tow system storage compartment of limited size. Therefore, in order to be stored within the storage compartment and deployed and/or retrieved through the fixed size opening, the variable drag area device 160, 660 can be limited in its maximum dimensions and require additional projected area to obtain a minimum required drag.

In this embodiment, inner drag fins 220b are not included, which provides for additional space within outer drag fins 220a to store membrane 600 when variable drag area device 660 is closed. In another example, variable drag area device 660 can include any number of drag fins 220. In another example, variable drag area device 660 can also include inner drag fins 220b. Membrane 600 is a flexible membrane attached to the drag fins 220 by any conventionally known device or construct. Membrane 600 may be attached to outer drag fins 220a, inner drag fins 220b, or any combination or number of drag fins 220. In another example, drag fins 220 do not include drag surfaces 221 and membrane 600 is attached to drag arms 222 (not shown). Membrane 600 can be configured to be any shape so as to provide the desired projected area profile for a fully open position to a fully collapsed position and any position in between. Membrane 600 can be made out of any flexible material, permeable or impermeable that supplies adequate strength and flexibility for the operating environment. Examples can include a poly-urethane material, as well as other materials and arrangements.

As can be seen, variable drag area tow system 100, as well as variable drag area device 160, 660, provide for a larger drag area and projected area when the relative velocity of tow system 100 through a fluid is less than when the relative velocity is greater. As the relative velocity increases, the drag area or projected area of variable drag area tow system 100 as well as variable drag area device 160, 660 decreases. This feature allows a vessel or aircraft towing variable drag area tow system 100 to operate in expanded operating conditions including a wider range of operating speeds and a wider range of altitude or depths. Any number of variable drag area devices 160, 660 may be included within variable drag area tow system 100, including one or a plurality of variable drag area devices 160, 660.

The foregoing merely illustrate the principles of the invention. Although the invention may be used to particular advantage in the context of underwater vehicles, those skilled in the art will be able to incorporate the invention into other environments and vehicles. It will thus be appreciated that those skilled in the art will be able to devise numerous alternative arrangements that, while not shown or described herein, embody the principles of the invention and thus are within its spirit and scope.

What is claimed as new and desired to be protected by Letters Patent of the United States is:

1. A tow system apparatus comprising:
    a variable drag area device including,
        a support structure;
        a forward end and an aft end, the forward end having an attachment point for being towed in a forward direction
        at least one moveably attached arm connected to the support structure at a connection point, and
        an expansion mechanism adapted to exert a force on the at least one arm in a direction toward the forward end, wherein the connection point is between the forward end and the expansion mechanism,
    wherein the variable drag area device has a variable projected area and the variable drag area device is adapted to have a larger projected area as a relative velocity of the variable drag area device with respect to a fluid decreases.

2. The tow system apparatus of claim 1, wherein the variable drag area device is adapted to have a smaller projected area as the velocity of the variable drag area device with respect to the fluid increases.

3. The tow system apparatus of claim 1, wherein the variable drag area device comprises at least one drag fin configured to vary the projected area of the variable drag area device when the at least one moveable drag fin is moved.

4. The tow system apparatus of claim 3, wherein the at least one moveably attached arm is at least one pivotably attached arm.

5. The tow system apparatus of claim 1, wherein the at least one arm is connected via at least one mechanical linkage to the expansion mechanism.

6. The tow system apparatus of claim 2, wherein the expansion mechanism is adapted to resist the movement of the at least one arm when the arm is being moved from a higher projected area to a lower projected area.

7. The tow system apparatus of claim 5, wherein the expansion mechanism is at least one spring.

8. The tow system of claim 5, wherein the expansion mechanism is a compressible fluid.

9. The tow system apparatus of claim 3, wherein the at least one drag fin comprises a drag surface attached to the at least one arm.

10. The tow system apparatus of claim 3, wherein the variable drag area device includes a membrane attached to the at least one drag fin, wherein the membrane is more flexible than the at least one drag fin.

11. A method of maintaining tension on a tow cable, the method comprising:
    deploying at a first velocity a variable drag area device having a variable projected area;
    decreasing the first velocity to a second velocity; and
    increasing the projected area of the variable drag area device as the first velocity is decreased to the second velocity,
        wherein the variable drag area devices includes,
        a support structure;
        a forward end and an aft end, the forward end having an attachment point for being towed in a forward direction,
        at least one moveably attached arm connected to the support structure at a connection point, and
        an expansion mechanism adapted to exert a force on the at least one arm in a direction toward the forward end, wherein the connection point is between the forward end and the expansion mechanism.

12. The method of claim 11, further comprising;
    increasing the second velocity to a third velocity;
    decreasing the projected area of the variable drag area device as the second velocity is increased to the third velocity.

13. The method of claim 12, wherein increasing the projected area comprises expanding or partially expanding at least one drag fin.

14. The method of claim 13, wherein the expansion mechanism is adapted to expand or partially expand the at least one drag fin.

15. The method of claim 14, wherein the expansion mechanism is at least one spring.

16. The method of claim 14, wherein the expansion mechanism is a compressible fluid.

17. The method of claim 11, further comprising:
    storing the variable drag area device in a variable drag area tow system storage compartment in a collapsed or partially collapsed configuration.

18. The tow system apparatus of claim 10, wherein the membrane comprises poly-urethane.

19. The tow system apparatus of claim 1, wherein the variable drag area device is adapted to have a larger projected area automatically caused by the decrease of the relative velocity and a force of the expansion mechanism.

20. The tow system apparatus of claim 2, wherein the variable drag area device is adapted to have a smaller projected area automatically caused by the increase of the relative velocity exerting a force to overcome a force of the expansion mechanism.

21. The tow system apparatus of claim 6, wherein the expansion mechanism is configured to resist the decrease in projected area as the relative velocity of the variable drag area device with respect to the fluid increases.

22. The tow system apparatus of claim 1, wherein the variable drag area device is adapted to have a continuously larger projected area as the relative velocity of the variable drag area device with respect to a fluid decreases.

* * * * *